P. Manny.
Mower.
Nº 27642
Patented Mar. 27, 1860.
Fig. 1.
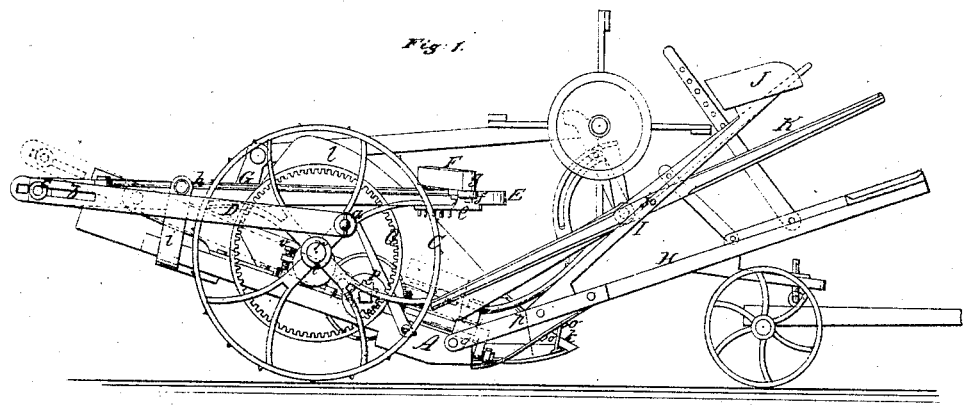
Fig. 2.
Fig. 3.
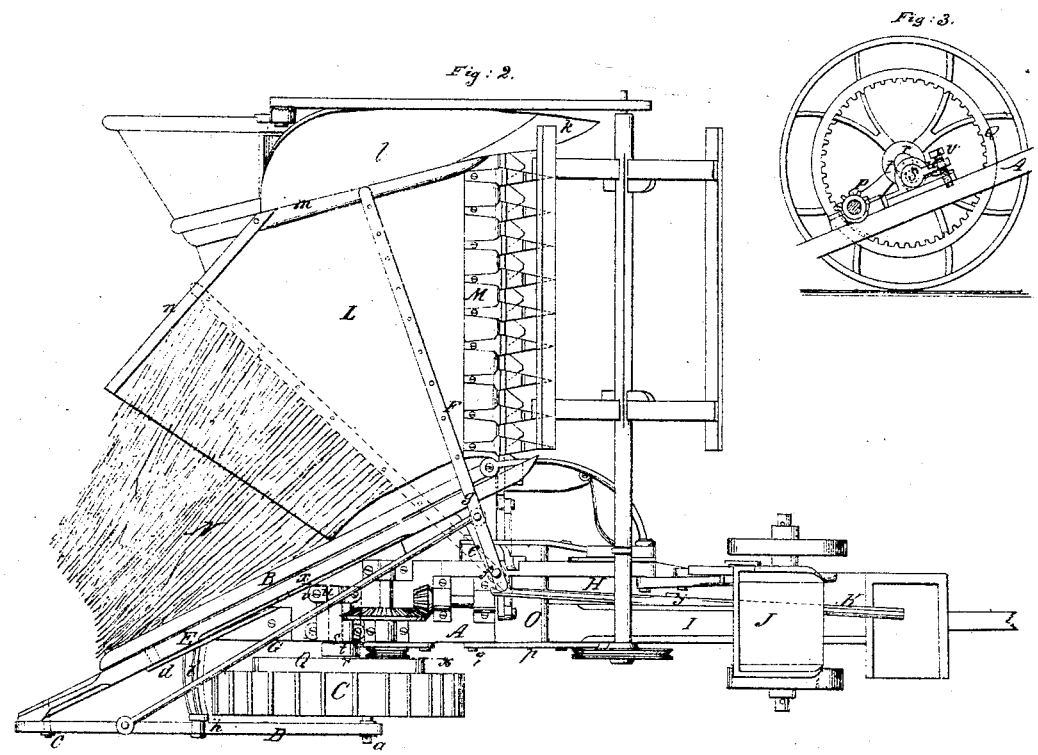
Witnesses:
Wm Thompson
Inventor:
Pells Manny

UNITED STATES PATENT OFFICE.

PELLS MANNY, OF WADDAM'S GROVE, ILLINOIS.

IMPROVEMENT IN HARVESTERS.

Specification forming part of Letters Patent No. 27,642, dated March 27, 1860.

*To all whom it may concern:*

Be it known that I, PELLS MANNY, of Waddam's Grove, in the county of Stephenson and State of Illinois, have invented certain new and useful Improvements in Harvesters; and I do hereby declare that the following is a full, clear, and exact description of the same, reference being had to the annexed drawings, making a part of this specification, in which—

Figure 1 is a side elevation of a harvester with my improvements applied to it; Fig. 2, a plan or top view of the same; Fig. 3, a section of a portion of the same, taken in the line $x$ $x$, Fig. 2.

Similar letters of reference indicate corresponding parts in the several figures.

To enable those skilled in the art to fully understand and construct my invention, I will proceed to describe it.

A represents the main frame of the machine, to the inner side of which a bar, B, is attached obliquely and permanently, the degree of obliquity being shown clearly in Fig. 1. This main frame A is supported by a driving-wheel, C, which has a wrist-pin, $a$, attached to its outer side, said pin having a rod, D, fitted loosely on it, the outer or back end of which rod is slotted longitudinally, as shown at $b$, Fig. 1, to receive the joint-pin $c$ of a bar or lever, E, which is attached to the bar B, near its back end, by a fulcrum-pin, $d$. (Shown clearly in Fig. 2.) The lever E is parallel with the bar B, and to the front part of lever E there is attached about at right angles an arm, $e$, to the outer end of which a rake, F, is connected by a vertical joint-pin, $f$, the rake head or bar $g$ being over the lever E.

To the rake head or bar $g$ at a point between its pin $f$ and the lever E, there is connected by a joint-pin a rod, G, and the back end of this rod is connected by a joint-pin to the rod D at a point between the pin $c$ and a friction-roller, $h$, which is attached to a curved arm, $i$, connected with the main frame A, back of the driving-wheel C, as shown clearly in Figs. 1 and 2.

To the leading-boards H, which is attached to the main frame A in a manner hereinafter described, there is secured a spring-bar, I, which supports the driver's seat J. To the inner or left side of this bar I there is attached by a fulcrum-pin, $j$, a lever, K, the front end of which projects a little beyond the front end of the seat J, the back end of said lever extending back to a point on the main frame underneath the arm $e$ of the rake-bar $g$.

To the main frame A a platform, L, and finger-bar M are attached in any proper way. The front end of the platform is of course connected to the back part of the finger-bar, and at the outer or grain side of the platform there is the usual frame with the divider $k$ and wing $l$ attached.

To the outer or grain side of the platform there is attached a bar, $m$, which abuts against the divider and wing-frame; and this bar $m$ has a bar, $n$, secured to it obliquely near its back end, as shown clearly in Fig. 2. This bar $n$ serves as a partial support to the back part of the platform L; but it also serves another and more important function, as will presently be shown. The discharge end of the platform L extends from the outer end of the bar $n$ to the bar B, and a V-shaped opening, N, is formed between bar B and the end of the platform, as shown clearly in Fig. 2.

The above-described parts form the raking device with its immediate connections, and the operation of the same is as follows: As the machine is drawn along the rod D has a compound movement given it by the wrist-pin $a$, its slotted connection with lever E, and the friction-roller $h$, which latter serves as a bearing for the rod and causes its outer or back end to fall simultaneously with the rising of its front end. This movement of rod D gives an intermittingly rising-and-falling movement to the lever E. The lever E as it rises elevates the rake F, which is vibrated or moved over the surface of the platform L by the rod G, the latter receiving its motion from rod D. The vibrating movement of rake F is constant or continuous, not intermittent like the movement of lever E. This difference in the movement of said parts is owing to the slot $b$, which permits the rod D to move backward without affecting the lever E, and said lever is affected during the forward movement of rod D only through the agency of the friction-roller or bearing $h$. The rod G moves the rake F, when elevated, from the back to the front end of the platform, and in a reverse direction when it is depressed, and consequently during the latter movement of the rake the grain is raked off the platform. As the grain is raked off the platform its heads come in contact with the bar n, and said bar deflects the same toward the V-shaped opening N, and as the rake moves on toward the completion of its backward movement the grain is compressed between the rake and the bar B and is discharged through the V-shaped recess N in compact form. The grain, it will be seen by referring to the red lines in Fig. 2, is discharged in a position slightly oblique with the line of draft, and the positions of the friction-roller or bearing h and wrist-pin a are such that the lever E will be raised and allowed to fall at the proper time, it being understood that the rake and lever fall by their own gravity. This arrangement of the rod D, lever E, and rod G, as shown and described, admits of the rake F being operated to conform to the position of the platform L and bars n B—an end which could not be obtained by the direct action of the wrist-pin a on the lever which raises the rake, as shown in my Letters Patent of November 4, 1856, and previously alluded to.

In case at any time it should be requisite to elevate the rake and render it inoperative, the driver depresses the front end of the lever K, and thereby elevates the lever E and rake F. This is essential in certain cases where there are light crops or in passing over comparatively-barren spots, where sufficient grain would not be cut to form a proper-size gavel during the usual vibration of the rake.

The shoe O may be constructed precisely similar to those heretofore used—namely, of metal plate of such thickness as to insure a requisite degree of elasticity, and at the same time be sufficiently strong and durable. The shoe is permanently attached to the back end of the leading-board H, as shown at o, Fig. 1, and to the back end of the leading-board two metal bars, p p, are permanently attached—one at each side. The back ends of the bars p p are connected by joint-pins q to the front end of the main frame A. The bars p p are of such a length as to admit of the back end of the shoe O extending underneath the front end of the main frame A, as shown clearly in Fig. 1. The bars p p, therefore, it will be seen, form the only connection between the leading-board H and the main frame A, and not the shoe, as heretofore. By the employment or use of the bars p p for a connection and having the shoe detached from the main frame, all dirt, dust, grain-heads, and other substances which may chance to fall thereon are allowed to escape off the back end of the shoe, between it and the main frame, as indicated by the red dotted lines in Fig. 1. This escape of the trash off from the back part of the shoe O is consequent on the draft movement of the machine. Thus the shoe O, while performing its usual function of a guard in protecting the crank and connecting-rod from the loose cut grain below on the ground, is prevented from serving, as heretofore, as a receptacle for holding trash, which frequently impedes the movement of the crank and connecting-rod.

The wear and tear of the driving-gear of harvesters is considerable. The pinion P, which gears into the toothed rim Q, is, as well as the rim Q, soon worn so as to admit of considerable play. To avoid this I have the arm r of the driving-wheel C connected to the axle s by means of a crank-shaped bar, t, and having a projecting bar, u, attached to the inner end of the axle, with a set-screw, v, passing vertically through it, as shown clearly in Fig. 3. By adjusting this set-screw v the crank-shaped bar t may be set more or less forward or back, carrying with it, of course, the driving-wheel C and toothed rim Q, and the latter consequently may be adjusted relatively with the pinion P, so as to compensate for all wear and cause an easy and true movement of the sickle, and avoiding all unnecessary wear and tear.

I do not claim operating the rake F by means of a wrist-pin, slotted rod, and lever, irrespective of the arrangement herein shown of the above parts with the rod G and bearing h; but What I do claim as my invention, and desire to secure by Letters Patent, is—

The arrangement of the wrist-pin a, rod D, slotted as shown, and connected with the lever E, the friction-roller or bearing h, and connecting-rod G, arranged for joint operation as and for the purpose set forth.

PELLS MANNY.

Witnesses:
WM. THOMPSON,
B. GIROUX.